United States Patent
Dorfschmid et al.

(10) Patent No.: US 6,167,773 B1
(45) Date of Patent: Jan. 2, 2001

(54) ADJUSTING DEVICE FOR THE AUTOMATIC OPERATION OF A GEAR-CHANGE DEVICE

(75) Inventors: Jens Dorfschmid, Notzingen; Andreas Ratte, Dittelbrunn, both of (DE)

(73) Assignee: Mannesmann Sachs AG, Schweinfurt (DE)

( * ) Notice: Under 35 U.S.C. 154(b), the term of this patent shall be extended for 0 days.

(21) Appl. No.: 09/239,471

(22) Filed: Jan. 28, 1999

(30) Foreign Application Priority Data

Jan. 29, 1998 (DE) .............................................. 198 03 338

(51) Int. Cl.[7] .................................................... F16H 59/04
(52) U.S. Cl. .......................... 74/473.11; 74/335; 74/470; 74/473.29; 403/286; 403/350; 403/353
(58) Field of Search ........................ 74/335, 470, 473.11, 74/473.29; 403/286, 350, 353, DIG. 11

(56) References Cited

U.S. PATENT DOCUMENTS

| 3,039,321 | * | 6/1962 | Weymann | 74/336.5 |
|---|---|---|---|---|
| 4,527,441 | * | 7/1985 | Nakahama | 74/473.1 X |
| 4,580,457 | * | 4/1986 | Ishida et al. | 74/335 |
| 4,872,361 | * | 10/1989 | Muller | 74/470 X |
| 4,938,088 | * | 7/1990 | Langley et al. | 74/473.1 X |
| 5,000,716 | * | 3/1991 | Canavesi | 446/468 |
| 5,638,720 | * | 6/1997 | Weinhart et al. | 74/473.29 |
| 5,865,066 | * | 2/1999 | Osborn et al. | 74/473.15 X |

FOREIGN PATENT DOCUMENTS

| 43 09 901 | 9/1994 | (DE) | B60K 23/02 |
|---|---|---|---|
| 43 11 855 | 10/1994 | (DE) | F16H 59/04 |
| 296 22 669 | 5/1997 | (DE) | C05G 1/00 |

* cited by examiner

*Primary Examiner*—Allan D. Herrmann
(74) *Attorney, Agent, or Firm*—Cohen, Pontani, Lieberman & Pavane

(57) ABSTRACT

Adjusting device for the automatic operation of a gear-change device with a shifting shaft associated with linear drives to introduce a rotational and a translatory movement. To convert an introduced translatory movement into a rotational movement, the linear drive provided to introduce rotational movement is actively connected to the shifting shaft by an articulated connection having two support elements that are urged toward each other by a prestress force and an articulated element actively connected in a force locking position between the two support elements by the prestress force.

19 Claims, 4 Drawing Sheets

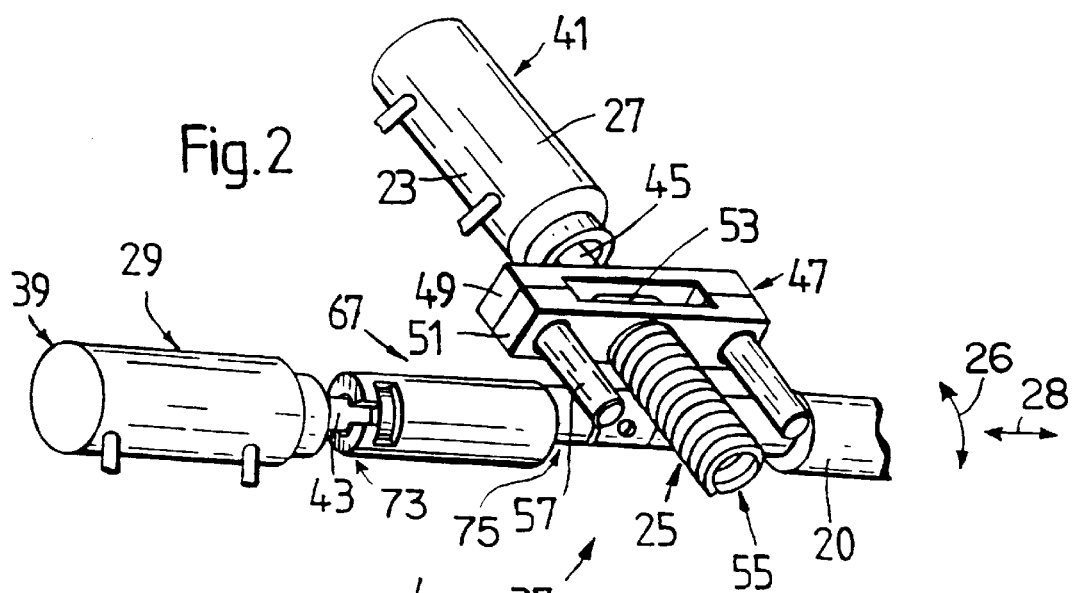
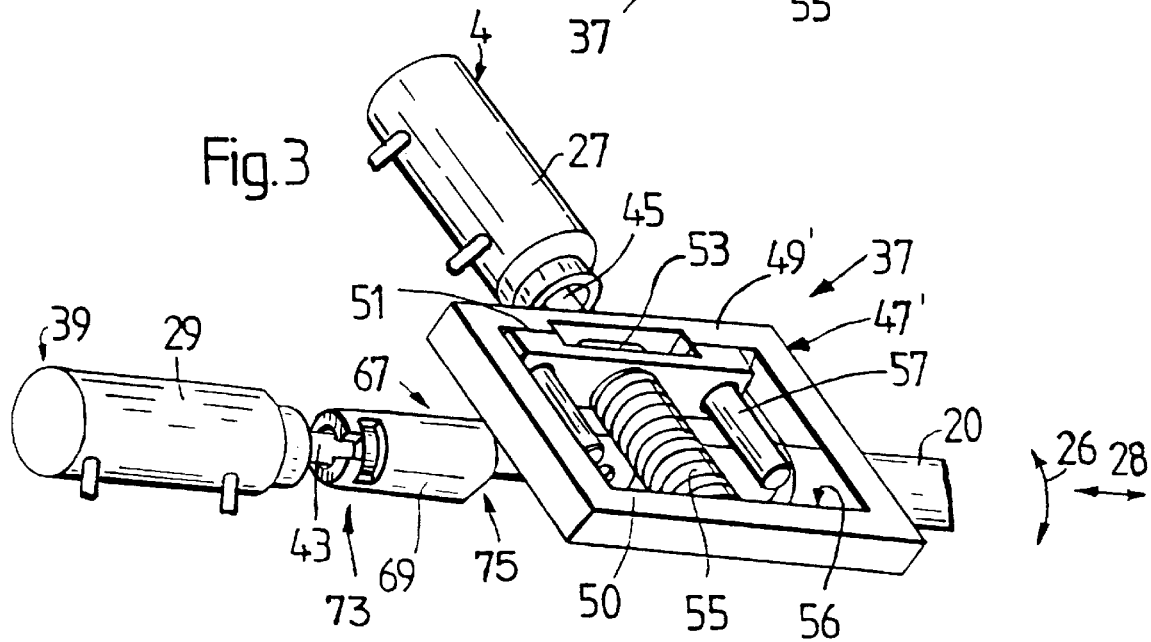
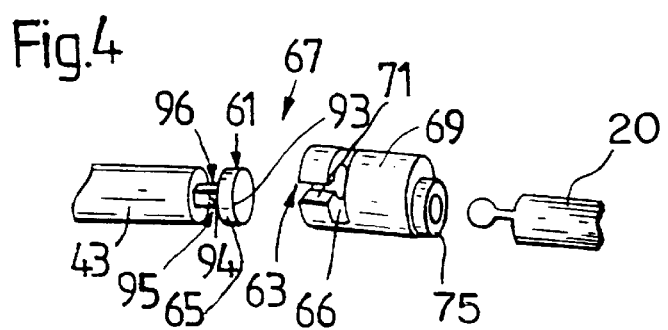

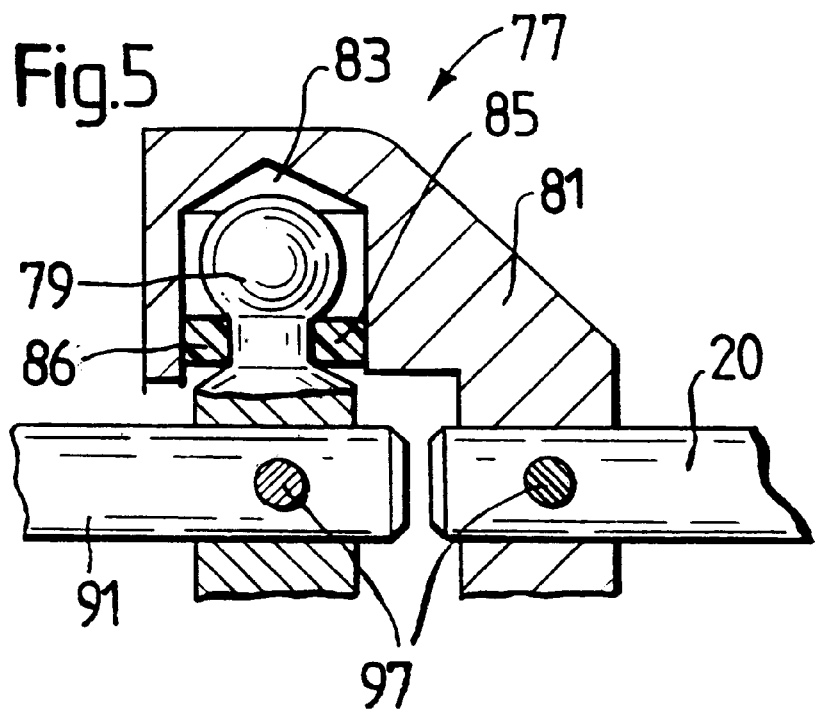
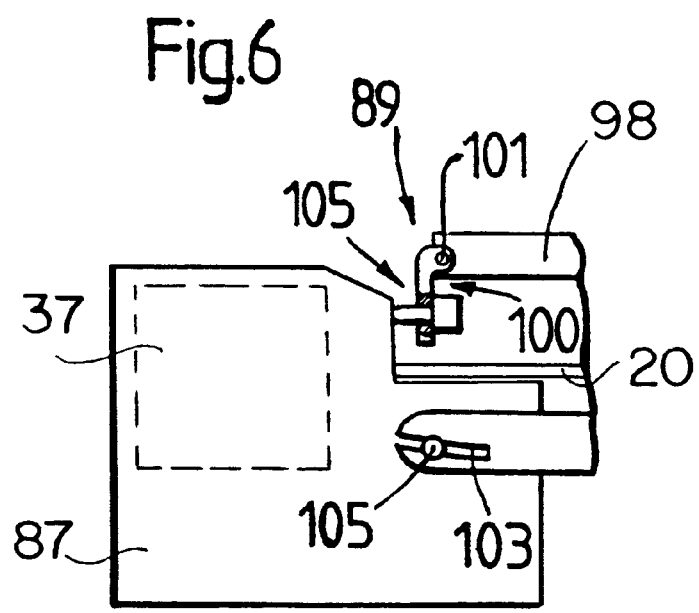

ADJUSTING DEVICE FOR THE AUTOMATIC OPERATION OF A GEAR-CHANGE DEVICE

BACKGROUND OF THE INVENTION

1. Field of the Invention

The invention relates to an adjusting device in a motor vehicle for the automatic operation of a gear-change device having a shifting shaft with linear drives for introducing a linear movement and a translatory movement to the shafting shaft.

2. Description of the Related Art

An adjusting device in a motor vehicle for the automatic operation of a gear-change device is already known, for example, from DE 43 11 855 A1. In this prior art device, drives are pressurized for the automatic operation of the gear-change device. More specifically, the drives include hydraulic cylinders with piston rods that execute a linear movement when activated, whereby the piston rods form output parts of the drives. At least the cylinder provided for the introduction of a rotational movement of the shifting shaft is connected to the shifting shaft via a ball-and-socket joint connection, as shown in FIG. 25 of this reference. This ball-and-socket joint has an articulated input element with a recess, in which a ball head of an articulated output part is mounted, so that a rotational movement of the shifting shaft results from a translatory deflection of the input part.

A problem with this prior art device is that such articulated connections have play, due to manufacturing tolerances and material fatigue. The play requires that a distance must be traveled by the piston rods of the hydraulic cylinders when the operating direction is changed before the shifting shaft moves in response to the introduced movement.

SUMMARY OF THE INVENTION

The object of the invention is to further develop a gear actuator that precisely positions the shifting shaft so that each introduced movement results in a predetermined movement of the shifting shaft.

The object of the invention is attained by an adjusting device for automatically operating a gear-change having a shifting shaft, includes a first linear drive with a first output part connectable to the shifting shaft for introducing a rotational movement of the shifting shaft via an articulated connection and a second linear drive having a second output part connectable to the shifting shaft for introducing a translatory movement of the shifting shaft. The articulated connection has first and second support elements held relative to teach other by a prestress force and an articulated element held between said first and second supports by said prestress force.

The measure of equipping the gear actuator with an articulated connection for converting a translatory movement introduced by a linear drive into a rotational movement, whereby the articulated connection has at least two support elements, which are prestressed relative to each other in such a way that an articulated element remains in uninterrupted active connection with the support elements in an articulated and force-locking fashion, creates an articulated connection with no play. Manufacturing tolerances may be compensated for by this design. The freedom from play ensures that each movement introduced via the linear drive results in a movement of the shifting shaft. As a result, the shifting shaft can be precisely positioned in a predetermined manner upon precise activation of the linear drive. Dead times, which, if play exists, must be calculated into the transmission path, do not occur. As a result, the reaction speed of the gear actuator is increased. The amount of prestress of the support elements is selected so that a force locking connection is ensured even in the event of plastic deformation of the support elements and/or the articulated output element. Such plastic deformation may result from the prestress force that acts on the support elements and the articulated element to ensure the uninterrupted force lock, as well as from wear due to age.

In an advantageous embodiment, the articulated element is mounted in a rotation-proof fashion and axially movable in the direction of the shifting shaft. For example, the articulated element may be connected to the shifting shaft via a longitudinal toothing. Such rotation-proof connections are smooth-running, so that the transverse force acting on the articulated output element upon a translatory movement of the shifting shaft is negligible. In addition, the work consumed by friction on the toothing is slight and thus negligible.

In another advantageous embodiment, the articulated element is securely connected to the shifting shaft and, in particular, is embodied in one piece with the shifting shaft. In this way, the number of required parts is reduced, which reduces manufacturing costs. Decoupling of the translation and rotational movements of the shifting shaft can be realized via axial mobility of the articulated output element in the axial direction of the shifting shaft relative to the support elements. The connected surfaces of the articulated element and the support element should be embodied as smoothly as possible, so that the work consumed by friction upon relative movements is as low as possible. It can also he advantageous to embody the articulated element and the support elements with reciprocally matching contours, so that the surface supporting the articulated element on the support element is, as needed, as large as possible, in order to attain low area pressure, or as small as possible, in order to attain the smallest friction area possible. With a small support surface, only small partial areas of the support elements need be embodied with a smooth surface to ensure a smoothly-running relative movement of the contacting surfaces.

In another advantageous embodiment, a support element is embodied in one piece with the output part of the linear drive provided for the introduction of the rotational movement of the shifting shaft. This support element is preferably equipped with a connecting element, by means of which a further support element is mounted movably relative to the First support element. Without modifying the basic structure, the support elements may also be embodied in multi-part fashion, or multiple support elements may be associated with the first support element. In the previously described arrangement, final assembly is easy to carry out, in that the second support element is placed on the connecting element. To provide the prestress of the support elements relative to each other, a spring element is preferably provided. If a simple-acting cylinder is used as a linear drive, it has proved advantageous for the return spring associated with the simple-acting cylinder to rest against a stationary part or against the second support element. The effective spring force of the return spring presses the second support element in the direction of the first support element, whereby the two support elements are oriented parallel to the shifting shaft. As a result, a decoupling of the rotational movement from the translatory movement is ensured.

In some applications, the articulated element may be arranged on the drive side, in particular, in one piece with the output part of the linear drive in the form of a projection. In such an embodiment, the support elements are arranged on the shifting shaft side. If a simple-acting cylinder is used as the linear drive, then the prestress of the support elements relative to each other can again be provided by the return spring, which rests against a support element. In this embodiment, the support element on the return spring side can be dipensed with, and the return spring then rests against the articulated element, so that the articulated element and the support element are actively connected in a force-locking manner.

It has proved advantageous to provide at least two support elements so that the return Spring rests against the articulated element and so that no transversal force relative to the spring force of the return spring acts on the return spring. Such a transversal force could result in eccentricity of the return spring, accompanied by a shortened useful life. To prestress the support elements, a separate spring element is provided. The support elements, with the shifting shaft, already prestressed relative to each other by means of a spring element, may be assembled into one unit. For final assembly, it is only necessary for the projection of the articulated output element to be inserted between the support elements. This advantage may also be obtained in the case of support elements on the drive side, namely, by providing a separate spring element. This arrangement is particularly suitable when a double-acting cylinder is provided as the linear drive.

It has proved advantageous for the linear drive that moves the shifting shaft in a translatory movement to be arranged in axial continuation relative to the shifting shaft. The output part associated with this linear drive is connected at least axially securely to the shifting shaft by a coupling device. It has also proved advantageous to provide a snap connection as the coupling device, so that simply by locking the snap connection, the desired connection is established. Preferably, the snap connection is embodied in such a way that the parts connected by it are rotatable relative to each other about an axis of rotation parallel to the axial axis of the shifting shaft to establish the connection.

In a further advantageous embodiment of a coupling device, a connecting pin is provided on one of the parts to be connected and is inserted into a recess embodied in the other part to be connected to establish the axial connection. In a preferred embodiment, the connecting pin or the associated recess has an orientation such that the connecting pin is insertable into the recess only at a predetermined orientation. Preferably, the connecting pin is inserted into the recess from the radial direction. By changing the rotational orientation of the connecting pin, it is possible to prevent the pin from emerging from the recess. The rotational movement resulting from the activation of the other drive in normal shifting operation is not sufficient to achieve the predetermined orientation at which the connecting pin could emerge from the recess. In some applications, it may be advantageous to establish the connection by introducing the connecting pin into the recess from the axial direction. Even in such an embodiment, the parts to be connected have an orientation such that a connection not detachable during normal adjustment operation can be established by suitable rotation.

In a further embodiment, a carrier element is connected to the shifting shaft at the end of the shifting shaft in a rotatable but axially secure fashion for rotational decoupling. The connection point of the carrier element is eccentric relative to the shifting shaft. The connecting point between the output part of the linear drive and the carrier element is again arranged eccentrically on the carrier element. The eccentric arrangement of the connecting points on the carrier element prevents transmission of a rotational movement from the shifting shaft via the carrier element. Particularly if a piston-cylinder unit is used as a drive and the output part is securely connected to the piston, rotational movements of the piston can lead to losses of tightness. If a strong seal is provided to guarantee the tightness of the piston, this seal acts as a resistance, so that to introduce a rotational movement of a shifting shaft, it is necessary to provide a stronger drive or apply more power. This need can be avoided by means of the rotational decoupling.

It has proved advantageous for the shifting shaft to be equipped with an adjustment mechanism by means of which its manufacturing tolerances can be compensated for.

It has also proved advantageous for the adjustment mechanism to be embodied in such a way that an end section of the shifting shaft, on which the linear drives act, is disconnectable from the shifting shaft. As a result, the transmission actuator may be assembled as an independent structural unit. This structural unit may be connected in its entirety during final assembly to the shifting shaft, which protrudes from the gearbox. In addition, if the gear actuator is defective, it can be easily exchanged in its entirety or easily removed from the motor vehicle for repair.

In an advantageous embodiment of an adjustment mechanism, the connection of the output shaft of the transmission actuator to the shifting shaft is established via the intermediate connection of a damping device, so that only a fraction of the vibrations transmitted by the engine to the gearbox can be transmitted to the gear actuator.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 is a perspective view showing an embodiment of a gear actuator for use in the arrangement of FIG. 1;

FIG. 3 is a perspective view showing another structure of another embodiment of a gear actuator for use with the arrangement of FIG. 1;

FIG. 4 shows a coupling device for use with the arrangement of FIG. 1;

FIG. 5 shows an adjustment mechanism for use with the arrangement of FIG. 1;

FIG. 6 shows a connecting device for use with the arrangement of FIG. 1.

DETAILED DESCRIPTION OF THE PRESENTLY PREFERRED EMBODIMENTS

Figure 1:
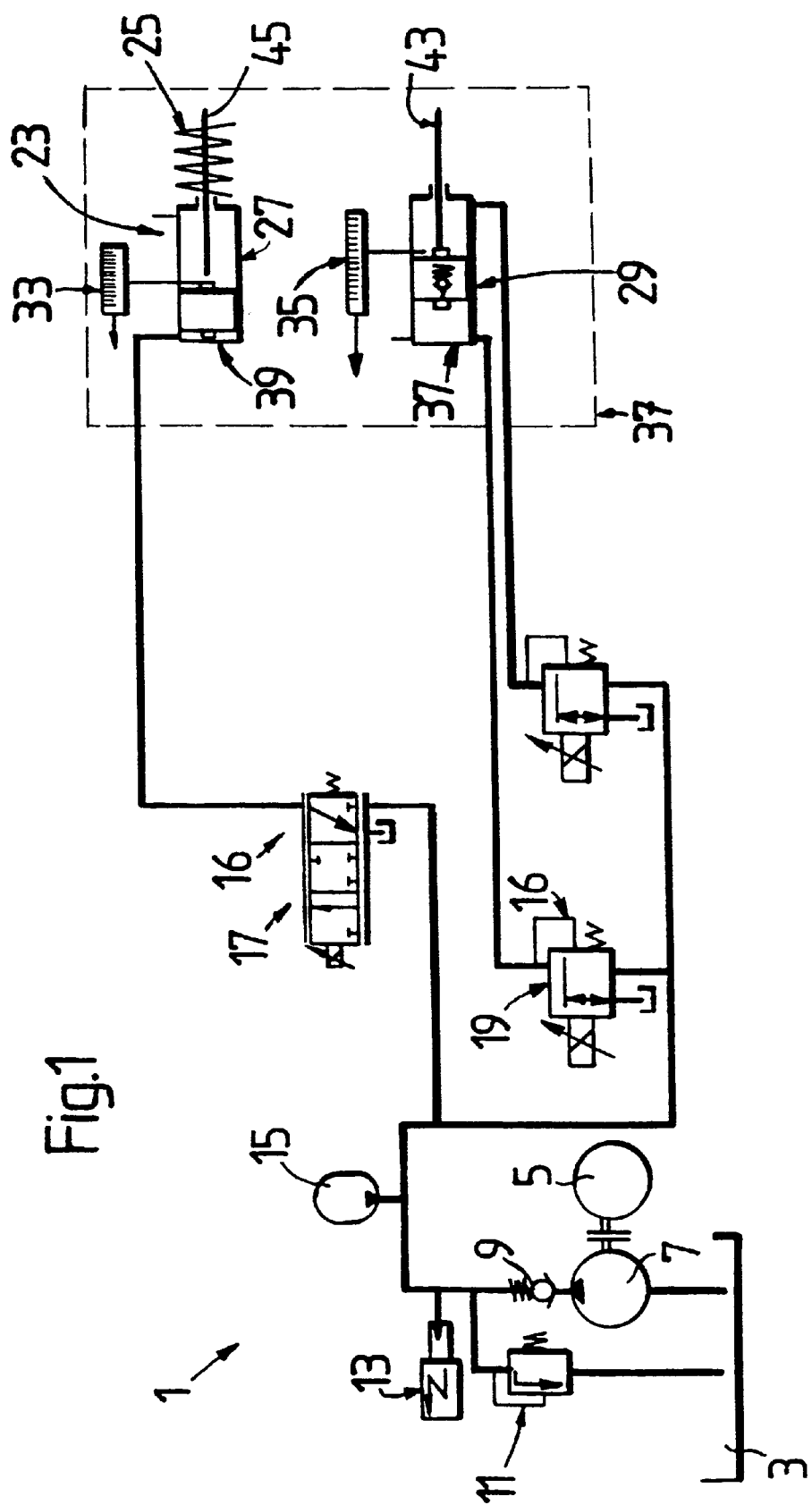
FIG. 1 is a schematic diagram of an arrangement for the automatic operation of a gear according to an embodiment of the invention.

FIG. 1 is a schematic diagram showing an arrangement 1 for automatically operating a gear change device. The arrangement 1 comprises a tank 3 holding a hydraulic medium. The hydraulic medium is conveyed by a pump 7, which can be driven by a motor 5, via a check valve 9 to a pressure storage device 15. A pressure sensor 13 and a pressure limit valve 11 are connected between the pump 7 and the pressure storage device 15. The pressure limit valve 11 opens at a predetermined pressure, allowing the hydraulic medium to be fed back into the tank 3 in an overpressure condition. A gear actuator 37 including a simple-acting cylinder 23 with an associated return spring 25 and a double-acting cylinder 29 is hydraulically connected to the pressure storage device 15 via valve units 16 and pressurized. The valve units 16 are activated by a control device that is not shown.

In the embodiment shown in FIG. 1, the valve unit 16 connecting the simple-acting cylinder 23 to the pressure storage device 15 is a proportional directional valve 17 and each of the two valve units 16 connecting the double-acting cylinder 29 to the pressure storage device 15 is a proportional pressure control valve 19. However, value units 16 may include other valve arrangements, such as those disclosed by reference DE 43 09 901 A1, could also be provided.

Referring to FIGS. 1 and 2, an output part 45 of the simple-acting cylinder 23 is actively connected to the shifting shaft 20 via an articulated connection 47. A sensor 33 is associated with this cylinder 23 for sensing the current operational position. The cylinder 23 is a linear drive 41 for operation of the shifting shaft 20 in the track selection direction 26 and is designated in what follows as the selection cylinder 27. In this embodiment, track selection is accomplished by a rotational movement of the shifting shaft 20, while operation in a gear selection direction 28 is accomplished by a translatory movement of the shifting shaft 20.

The double-acting cylinder 29 is a linear drive 39 which has a linearly drivable output part 43 actively connected to the shifting shaft 20 for moving the shifting shaft 20 in the gear selection direction 28. A sensor 35 is associated with the cylinder 29 for sensing the current operational position.

Figure 7A:
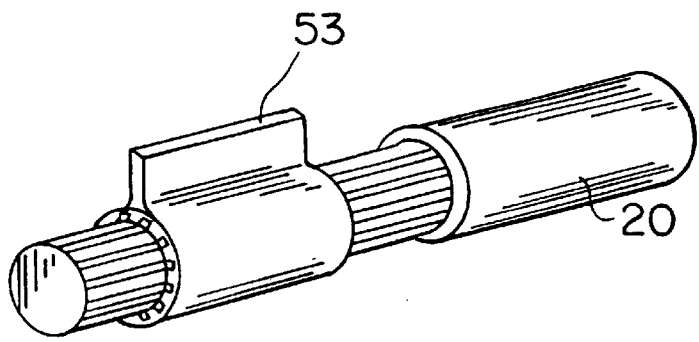
FIG. 7*a* is a perspective view of an embodiment of an articulated element on a shifting shaft.

In the embodiment shown in FIG. 2, the articulated connection 47 has a first support element 49 securely connected to the output part 45 of the selection cylinder 27. Connecting elements 57 are mounted on the first support element 49 which receive a second support element 51 which is movable relative to the first support element 49 on the connecting elements 57. A return spring 25 which rests between a housing (not shown) and the second support element 51 urges the second support element 51 toward the first support element 49. Referring also to FIG. 7a, articulated element 53 connected at least in a rotation-proof fashion such, for example, as by a toothing to the shifting shaft 20 is articulately arranged between the support elements 49, 51. The extension of the articulated element 53 is so great that the support elements 49, 51 are separated in the area of the articulated element 53, thereby providing a space in which the articulated element 53 is received.

Figure 7B:
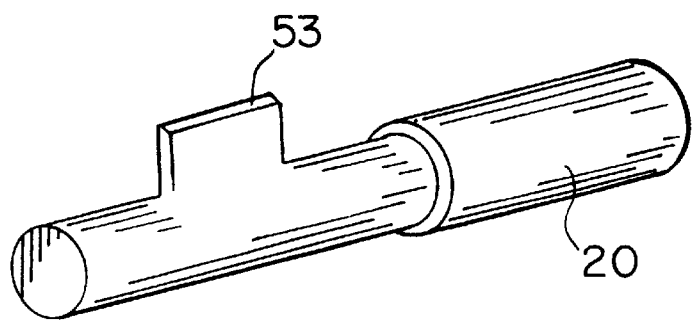
FIG. 7*b* is a perspective view of another embodiment of an articulated element on a shifting shaft.

In this embodiment, the radial projection formed by the articulated element 53 is axially movable in connection with the shifting shaft 20 between the support elements 49, 51. However, it is also possible to mount the articulated element 53 in an axially movable but rotation-proof fashion on the shifting shaft 20. Furthermore, the articulated element 53 may also comprise an integral part of the shifting shaft 20 as shown in FIG. 7b.

Figure 8:
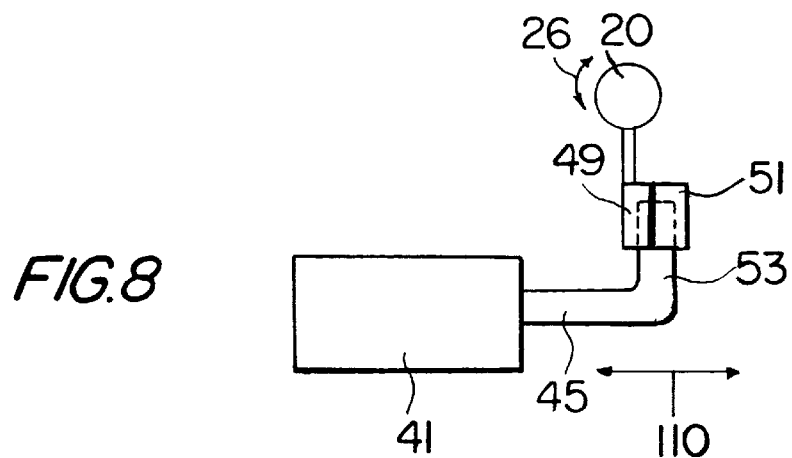
FIG. 8 is a schematic view of another embodiment of a gear actuator according to the present invention.

In an alternative embodiment shown in FIG. 8, the articulated element 53 comprises a part of or is fixedly connected to the output part 45. In this embodiment, the support elements 49, 51 are arranged on the shifting shaft 20. More specifically, the first support element 49 is rotatably fixedly connected to the support shaft 20.

The output part 43 of the double-acting cylinder 29 is connected at an end of the shifting shaft 20 by a coupling device 67 in at least an axially fixed fashion. Examples of possible coupling devices 67 are described below in reference to FIGS. 4 and 5. The basic function of the depicted gear actuator 37 will first be described in greater detail. Because the activation of gear actuators is widely known from numerous publications, it will not be discussed in further detail here.

When the selection cylinder 27 is pressurized, the output part 45 is moved linearly causing the first support element 49 connected there to carry out a tranlatory movement. The spring force of the return spring 25 acting on the second support element 51 ensures that the articulated element 53 remains in uninterrupted contact between the support elements 49, 51 during the translatory movement. As a result, the articulated element 53 and the second support element 51 carry out exactly the translatory movement introduced by the output part 45.

This translatory movement of the articulated element 53 causes a rotational movement of the shifting shaft 20 because of the rotation-proof connection of the articulated element 53 to the shifting shaft 20.

To introduce a translatory movement that corresponds to placement into a gear, the linear drive 39 is pressurized to move the output part 43 through a translatory movement in the axial direction of the shifting shaft 20, which is connected to the output part 43 in an axially fixed fashion by means of a coupling device 67. A possible embodiment of a coupling device is described below in reference to FIG. 4.

The gear actuator 37 shown in FIG. 3 differs from that in FIG. 2 essentially only in the embodiment of the articulated connection 47'. This articulated connection 47' comprises a separate spring element 55, which rests against a projection 50 embodied in one piece with a first support element 49' as well as against the second support element 51. The spring force of the spring element 55 presses the second support element 51 in the direction of the first support element 49'. The first and second support elements 49', 51 comprise an assembly unit that can be assembled in modular fashion. The structure of the articulated connection corresponds to that already described in reference to FIG. 2. This design of the articulated connection 47 is especially suitable when the selection cylinder 27 is a double-acting cylinder that has no return spring 25.

An example of a coupling device 67 is now described with reference to FIG. 4 for connecting the output part 43 with the shifting shaft 20. The coupling device 67 includes a connecting pin 65 formed in one piece with the output part 43. However, the connecting pin 65 may also be securely connected to the output part 43 such, for example, as by a threaded connection. This connecting pin 65 has a body 95 with a square profile and a head 93. A carrier element 69 is attachable to the output part 43 at a first connection point 73 and includes a counter element 63 associated with this connecting pin 65. The carrier element 69 has a recess 66 which extends over a segment 71 of the outer circumference of the carrier element 69. The connecting pin 65 is insertable into the recess 66 from a radial direction. The recess segment 71 associated with the body 95 is slightly larger than the edge length 94 of the square profile 96. After being introduced into the recess 66, the connecting pin 65 is turned relative to the carrier element 69, preferably, for reasons of symmetry, by 45 degrees. An emergence of the connecting pin 65 from the recess 66 is prevented by the dimensions of the segment 71. The recess 66 is embodied in such a way that the body 95 of the connecting pin 65 is eccentric to the carrier element 69. The carrier element 69 has, on the side facing away from the output part 43, a second connection point 75 which is eccentric to the carrier element 69 and to the first connection point 73. The second connection point 75 is provided to establish an axially secure connection via the carrier element 69 and the shifting shaft 20. This connection is a snap connection, which connects the end of the shifting shaft 20 to the carrier element 69 in an axially secure but rotatable fashion. The carrier element 69 may also be embodied in one piece with the shifting shaft 20, whereby a rotational decoupling is provided between the output part 43 and the shifting shaft 20 via the connecting pin 65. In this case, the recess must be arranged concentric to the shifting shaft 20, whereby the rotational movement introducible via the other linear drive 41 is substantially smaller than the rotational movement required for insertion of the connecting pin 65 into the recess 66.

Instead of the coupling connection 67, FIG. 5 shows an adjustment mechanism 77, by means of which an end section 91 is connectable to the shifting shaft 20. On the end section 91 is an element that forms a radial projection 79. This radial projection 79 extends into a recess 83 of a holding element 81 provided to hold it. This holding element 81 is mounted on the shifting shaft 20. The radial projection is securely connected to the holding element 81 via a damping device 85, which consists of an elastic material 86 acting as an absorption mass. After orientation of the end section 91 and the shifting shaft 20, the element forming the radial projection 79 as well as the holding element 81 are securely connected to the shaft 20 via respective pin connections 97. The end section 91 is connectable to the output part 43 for introducing the translatory movement to the shafting shaft 20. The damping device 85 limits the amount of vibrations transmitted to the gear actuator 37.

FIG. 6 shows an example of an attachment device 89 which is used for attaching a housing 87 which accommodates the articulated connection 47 and the coupling device 67 of the gear actuator to a gear box 98. The housing 87 is positionable with respect to the gear box via an articulated connection, here, the hinged connection 101. Further attachment points 105 between housing 87 and the gear box may be varied by the provision of longitudinal holes 103 of a certain scope. After the position of the housing 87 and the gearbox relative to each other is established, the relative positions are arrested by establishment of the attachment points 105.

The invention is not limited by the embodiments described above which are presented as examples only but can be modified in various ways within the scope of protection defined by the appended patent claims.

We claim:

1. An adjusting device for automatically operating a gear-change device having a shifting shaft, comprising:
   a first linear drive having a first output part operatively connectable to the shifting shaft via an articulated connection for introducing a rotational movement to the shifting shaft;
   a second linear drive having a second output part operatively connectable to said shifting shaft for introducing a translatory movement to the shifting shaft; and
   said articulated connection comprising first and second support elements, a prestress force means for urging said second support element toward said first support element, and an articulated element held between said first and second supports in a force locked position by said prestress force means, said articulated element being connectable to the shifting shaft.

2. The adjusting device of claim 1, wherein said articulated element is rotatably fixedly mountable on the shifting shaft for forming a radial projection on the shifting shaft and axially movably mountable on the shifting shaft.

3. The adjusting device of claim 1, wherein said articulated element is formable as one piece with the shifting shaft for forming a radial projection and said articulated element is axially movable relative to said first and second support elements in an axial direction of the shifting shaft.

4. The adjusting device of claim 1, wherein said first output part is arrangeable at an angle to the shifting shaft and linearly deflectable, and wherein one of said first and second support elements is axially movable mounted relative to said first output part.

5. The adjusting device of claim 4, further comprising a connecting element operatively connecting said first and second support elements, wherein one of said first and second support elements is movably mounted on said connecting element.

6. The adjusting device of claim 5, wherein said connecting element is formed as one piece with said first support element.

7. The adjusting device of claim 1, wherein said first support element is formed as one piece with said first output part.

8. The adjusting device of claim 1, wherein said prestress force means comprises a spring actively connected to said second support element for urging said second support element toward said first support element.

9. The adjusting device of claim 1, wherein said first linear drive for the introduction of the rotational movement is operatively arranged at an angle to said shifting shaft.

10. The adjusting device of claim 1, wherein said prestress force means comprises a spring element, said first support element comprises a support surface, and said spring element is actively connected between said support surface and said second support element.

11. The adjusting device of claim 1, wherein said first linear drive comprises a simple-acting cylinder and an associated return spring, wherein said return spring comprises said prestress means.

12. The adjusting device of claim 1, wherein said articulated element comprises a projection connected with said first output part, wherein at least one of said first and second support elements is rotatably fixedly connected to the shifting shaft.

13. The adjusting device of claim 1, wherein one of said first and second support elements is rotatably fixedly connected to the shifting shaft.

14. The adjusting device of claim 13, wherein said first linear drive comprises a return spring element operatively connected to the other of said first and second support elements for providing a return force to said first linear drive.

15. The adjusting device of claim 1, for further comprising a housing accommodating said articulated connection and an attachment device articulately connected to said housing, said attachment device being collectable to a gearbox of the gear-changing device for articulately connecting said housing to the gearbox.

16. An adjusting device for the automatic operation of a gear-change device with a shifting shaft, comprising:

a first linear drive having a first output part connectable to the shifting shaft via an articulated for connection introducing a rotational movement to the shifting shaft;

a second linear drive having a second output part connectable to the shifting shaft for introducing a translatory movement to the shifting shaft; and a coupling device connectable between said second output part and an axial end of the shifting shaft for axially fixedly connecting said second output part to the shifting shaft, wherein said second output part comprises a connecting pin having a body and a head and said connecting pin is insertable in a recess for accommodating said connecting pin in the axial end of the coupling device, and wherein said connecting pin is removable from the recess when said connecting pin is in a first orientation with said recess and is lockable in said recess when said connecting pin is rotated to a second orientation with said recess.

17. An adjustment device for the autotomatic operation of a gear-change device with a shifting shaft, comprising:

a first linear drive having a first output part connectable to the shifting shaft via an articulated for connection introducing a rotational movement to the shifting shaft;

a second linear drive having a second output part connectable to the shifting shaft for introducing a translatory movement to the shifting shaft; and a coupling device connectable between said second output part and an axial end of the shifting shaft for axially fixedly connecting said second output part to the shifting shaft, wherein said coupling device comprises a carrier element having a connection point eccentric relative to the shifting shaft, wherein said carrier element is axially fixedly connectable to the shifting shaft via said connection point.

18. The adjustment device of claim 17, wherein said second output part is connectable to the shifting shaft via said connection point that is eccentric relative to the shifting shaft.

19. The adjustment device of claim 17, wherein said second output part is fixedly connected to said carrier element via a rotary coupling such that a rotation of said second output part relative to said carrier element by a predetermined amount operatively decouples said second output part from said carrier element.

* * * * *